(12) United States Patent
Burmester et al.

(10) Patent No.: US 11,525,390 B2
(45) Date of Patent: Dec. 13, 2022

(54) CONTROL DEVICE FOR AN EXHAUST GAS-CONDUCTING SECTION OF AN EXHAUST TURBOCHARGER

(71) Applicant: IHI Charging Systems International GmbH, Amt Wachsenburg OT Ichtershausen (DE)

(72) Inventors: Hermann Burmester, Heidelberg (DE); Manfred Guthörle, Neckarbischofsheim (DE); Daniel Senz, Korschenbroich (DE)

(73) Assignee: IHI Charging Systems International GmbH, Amt Wachsenburg OT Ichtershausen (DE)

( * ) Notice: Subject to any disclaimer, the term of this patent is extended or adjusted under 35 U.S.C. 154(b) by 247 days.

(21) Appl. No.: 17/043,762

(22) PCT Filed: Jun. 5, 2019

(86) PCT No.: PCT/EP2019/000176
§ 371 (c)(1),
(2) Date: Sep. 30, 2020

(87) PCT Pub. No.: WO2020/001806
PCT Pub. Date: Jan. 2, 2020

(65) Prior Publication Data
US 2021/0148279 A1    May 20, 2021

(30) Foreign Application Priority Data

Jun. 27, 2018 (DE) .......................... 102018115445.3

(51) Int. Cl.
*F02B 37/18* (2006.01)
*F01D 25/12* (2006.01)
(Continued)

(52) U.S. Cl.
CPC ............ *F02B 37/183* (2013.01); *F01D 25/12* (2013.01); *F02B 37/02* (2013.01); *F02B 37/22* (2013.01);
(Continued)

(58) Field of Classification Search
CPC .... F02B 37/183; F16K 43/008; F16K 49/005; F16K 49/002; Y10T 137/6579; Y10T 137/6525
See application file for complete search history.

(56) References Cited

U.S. PATENT DOCUMENTS 2,063,779 A * 12/1936 Baj ........................... F01P 3/14
123/41.77
3,089,304 A    5/1963 Bozzola
(Continued)

FOREIGN PATENT DOCUMENTS

DE        3145835 A1    5/1983
DE       19727141 C1    8/1998
(Continued)

*Primary Examiner* — Michael R Reid
(74) *Attorney, Agent, or Firm* — Smartpat PLC

(57) ABSTRACT

An exhaust gas-conducting section of an exhaust turbocharger comprises a duct with a through-flow opening which can be fully or at least partially blocked or released by a closure element of a control device. The closure element is designed as a poppet valve. The closure element can be moved by an actuator can be disposed in a wall of the exhaust gas-conducting section. The closure element has a closure body with an annular section surface on its bottom surface which faces the through-flow opening. The section surface corresponds to an element seat formed in the wall. Its top surface faces away from the bottom surface and is designed in a profiled manner in order to produce a top surface at least partially corresponding to another element seat and/or to achieve flow-optimized circulation.

11 Claims, 4 Drawing Sheets

(51) Int. Cl.
  *F02B 37/02* (2006.01)
  *F02B 37/22* (2006.01)
  *F16K 1/44* (2006.01)
  *F16K 11/044* (2006.01)
  *F16K 11/20* (2006.01)
  *F16K 31/122* (2006.01)
  *F16K 43/00* (2006.01)
  *F16K 49/00* (2006.01)

(52) U.S. Cl.
  CPC .............. *F16K 1/44* (2013.01); *F16K 11/044* (2013.01); *F16K 11/202* (2013.01); *F16K 31/1225* (2013.01); *F16K 43/008* (2013.01); *F16K 49/005* (2013.01); *F05D 2220/40* (2013.01)

(56) References Cited

U.S. PATENT DOCUMENTS

| | | |
|---|---|---|
| 3,270,495 A | 9/1966 | Connor |
| 3,423,926 A | 1/1969 | Nancarrow et al. |
| 3,776,275 A | 12/1973 | Updike |
| 4,075,849 A * | 2/1978 | Richardson ........... F02B 37/186 60/605.1 |
| 4,250,710 A * | 2/1981 | Matsuoka ............. F02B 37/186 60/602 |
| 4,601,304 A | 7/1986 | Schobl |
| 4,630,445 A | 12/1986 | Parker |
| 6,269,643 B1 | 8/2001 | Schmidt et al. |
| 6,293,300 B1 | 9/2001 | Dumke et al. |
| 2013/0011243 A1 | 1/2013 | Alajbegovic |
| 2013/0037148 A1 | 2/2013 | Anagnos |
| 2019/0048790 A1 | 2/2019 | Styles et al. |

FOREIGN PATENT DOCUMENTS

| | | |
|---|---|---|
| DE | 19826355 A1 | 12/1999 |
| DE | 102006024783 A1 | 11/2007 |
| DE | 202014100401 U1 | 2/2014 |
| DE | 102017108094 A1 | 10/2018 |
| WO | 2007060831 A1 | 5/2007 |
| WO | 2013022867 A1 | 2/2013 |

* cited by examiner

CONTROL DEVICE FOR AN EXHAUST GAS-CONDUCTING SECTION OF AN EXHAUST TURBOCHARGER

TECHNICAL FIELD

The disclosure relates to a control device for an exhaust gas-conducting section of an exhaust turbocharger.

BACKGROUND

Control devices for an exhaust gas-conducting section of an exhaust turbocharger are known. Thus, exhaust turbochargers, in particular exhaust turbochargers designed for single flow, comprise a bypass duct with a closure element, wherein the bypass duct is provided to divert an exhaust gas flow past the turbine wheel. With the aid of the closure element, the bypass duct is to be partially or fully opened or closed when required or according to demand from an engine controller of an internal combustion engine connected to the exhaust turbocharger.

Utility model document DE 20 2014 100 401 U1 and U.S. Pat. No. 3,423,926 A disclose a control device for an exhaust gas-conducting section of an exhaust turbocharger, wherein the exhaust turbocharger comprises a first flow and a second flow. The control device is provided for connection of the two flows in a manner permitting through-flow. For this purpose, a through-flow opening is provided in a flow-separating wall separating the two flows and can be opened or blocked by a closure element of the control device. With the aid of such a control device, it is possible, in specific operating points of the exhaust turbocharger, in particular in the case of operating points which have large flow quantities, to act upon the turbine wheel in a flow-promoting manner by closing or connecting the flows so that efficient operation of the exhaust turbocharger is rendered possible.

Patent document DE 197 27 141 C1 likewise discloses a control device for a dual-flow exhaust gas-conducting section, wherein a closure element of the control device is provided to blow off a fluid flowing through the two flows into a bypass duct in order to circulate around a turbine wheel rotatably received in the exhaust gas-conducting section.

For effective operation of the exhaust turbocharger, it is paramount to avoid losses owing to leakage and to make the fullest possible use of the energy contained within the exhaust gas stream. Provided that the fluid flowing through the flows is to act upon the turbine wheel as a so-called pulse turbocharging, there is to be the fullest possible fluidic separation of the two flows. If a so-called ram induction is desired in operation of the exhaust turbocharger, in particular at high loads and/or rotational speeds of an internal combustion engine thermodynamically connected to the exhaust turbocharger, a flow connection of the two flows is to be preferred. During pulse turbocharging, losses can be avoided by means of secured sealing of a through-flow opening formed between the two flows. In the same way, it is necessary to seal in a secured manner a further opening in the exhaust gas-conducting section which serves to receive in particular the closure element during an overflow of the fluid from the first flow into the second flow and vice versa.

In the case of an exhaust gas-conducting section designed only for single flow as well as in one designed for multi-flow, or at least dual flow, there is an aim to provide an exhaust gas-conducting section which is as free of losses as possible.

SUMMARY

Therefore, the object of the present disclosure is to provide an improved control device for an exhaust gas-conducting section of an exhaust turbocharger.

This object is achieved with the aid of a control device for an exhaust gas-conducting section of an exhaust turbocharger as described herein.

A control device for an exhaust gas-conducting section of an exhaust turbocharger comprises a closure element for complete or at least partial blocking or release of a through-flow opening of a duct of the exhaust gas-conducting section through which a flow can pass. The control device further comprises an actuator for moving the closure element. The closure element is designed as a poppet valve. It can be moved at least into a first position in order to release the through-flow opening and into a second position in order to block the through-flow opening. In at least one of the positions, it can be disposed in a wall of the exhaust gas-conducting section.

The closure element comprises a closure body closing or releasing the through-flow opening, which closure body comprises an annular section surface on its bottom surface which faces the through-flow opening, which section surface is designed to correspond to an element seat formed in the wall, and wherein its top surface which faces away from the bottom surface is designed in a profiled manner in order to produce a top surface at least partially corresponding to another element seat and/or to achieve flow-optimized circulation.

An advantage of the control device can be seen in the fact that the control device can be used both for an exhaust turbocharger with a bypass duct of a turbine wheel of the exhaust turbocharger, usually referred to as a so-called waste gate turbocharger, and also for a dual-flow exhaust turbocharger. Therefore, the control device can be produced inexpensively so that the costs of the exhaust turbocharger are reduced.

A further advantage can be seen in the fact that the correspondingly designed closure body, both on its bottom surface and also on its top surface, is designed to correspond to the walls which are in contact according to the corresponding positions, so that, in order to avoid leakage, a surface seal can be produced between the closure body and the walls. Alternatively, only one of the two surfaces, its bottom surface or its top surface, is designed to correspond to the corresponding wall, and the other surface, the top surface or bottom surface, is profiled corresponding to the flow-optimized circulation. The advantage in both cases is avoidance of leakage in order to increase the degree of efficiency of the exhaust turbocharger comprising the control device, whereby an internal combustion engine thermodynamically connected to the exhaust turbocharger can be operated with reduced consumption and accordingly reduced emissions.

In addition, the seal between the annular surface on the side facing away from the bottom surface of the closure body and the corresponding surface in the wall of the flow leads to avoidance of undesired uncleaned exhaust gas losses into the atmosphere in the form of a so-called blow-by, in interaction with the seal disposed on the shaft of the closure element.

In other words, this means that the poppet valve in both its positions is designed to be able to form a sealing region with the corresponding walls.

In the first case, the exhaust gas-conducting section is designed as a dual-flow exhaust gas-conducting section, wherein the through-flow opening is disposed in a flow-separating wall separating the two flows. In the second case, the closure element serves for partially or fully opening or closure of a bypass duct comprising a through-flow opening. In this case, for preferred sealing, the correspondingly designed closure element can be used in particular to close the bypass duct against the exhaust gas stream.

In a further embodiment of the control device, the element seats, the section surface and the top surface comprise a conical or frustoconical contour. The advantage of the conical or frustoconical seats and surfaces is to be found in an improved sealing function compared to conventional surfaces, i.e. non-inclined contours of the seats or surfaces or other feasible closure element designs, e.g. conical valves, roller valves, flat slide valves, rotating slide valves.

Centering of the closure body onto the seats by the conical or frustoconical structure increases the durability of the sealing function, in particular under operating conditions with the internal combustion engine in full-load operation when the fluid is at very high temperatures.

The positioning of the valve disc at both switching positions (during flow separation within the opening in the turbine housing separating wall, into which the first valve seat is integrated, or during flow connection within the valve housing) largely avoids disruption of the stream in both flows.

In a further embodiment of the control device, a shaft of the closure element, which carries the closure body, can be cooled. The preferred arrangement of the closure body in both positions, in the closed position in the flow-separating wall and during release of the through-flow cross-section in the exhaust gas-conducting section, or a wall formed in the exhaust gas-conducting section, which avoids disruptions in the fluid stream in the flows to the greatest extent, leads to heating of the shaft since this is disposed in the fluid stream during closure of the through-flow opening. Thus, cooling of the shaft with the aid of a cooling element is advantageous so that distortion of the closure element is prevented. This could lead to a depositioning and/or cessation of the sealing effects produced by reason of the seats and corresponding surfaces and between same.

For the purposes of improved cooling, the shaft is thus advantageously surrounded by the cooling element, and the cooling element can be designed as cooling ribs or a water jacket. A known sodium cooling technique for the shaft is unsuitable, since cooling with the aid of sodium requires a high frequency of the component to be moved, which is not present in this case. This means that the sodium would not be able to produce its cooling effect. Thus, both named cooling elements are preferably to be used. In the same way, the cooling means could also be fuel or lubrication oil. In a particularly advantageous manner, a cooling element which has internal ducts for cooling purposes can be produced using a laser method, so-called laser beam melting.

In a further embodiment of the control device, a coupling element is provided in order to connect the closure element to the actuator push rod of the actuator. Therefore, axial misalignments of the closure element can be effectively avoided.

In a particularly advantageous manner, the actuator is designed to initiate the movement of the closure element coaxially to the longitudinal axis thereof, since an effective force is applied in a single direction, the direction of the longitudinal axis. This corresponds to the shaft and/or the actuator being relieved of lateral forces, whereby a reduction in wear is achieved. In the same way, axial misalignments and jamming of the closure element can thereby be avoided.

In a further embodiment of the control device, the through-flow opening is closed with the aid of a spring force acting on the closure element. In the same way, this is to be understood to mean that the closing is supported by the spring force. Therefore, in particular in the case of a break in activation energy or failure of the actuator, secured separation of the flows can be produced, which permits preferred operation of the exhaust turbocharger in particular in the middle load and rotational speed range of the internal combustion engine. The spring force can be produced inexpensively with the aid of a tensioning element received in the actuator. In the same way, the tensioning element could also be disposed outside an actuator housing.

In a further embodiment of the control device, in order to guide the closure element, the housing comprises a holding element protruding into the actuator housing. This is advantageously to be provided in particular in the case of a closure element with its shaft directly attached to an actuator carriage of the actuator, since a corresponding alternating loading of the closure element is present during operation of the exhaust turbocharger, and secured guidance of the shaft leads to breakage of the shaft being avoided.

In a further preferred embodiment, the closure element or at least its closure body is formed from a ceramic material. The control device and in particular the closure element are subjected during operation to temperature fluctuations which have a high temperature gradient, wherein very high absolute temperatures in the range of about 1000° C. routinely occur. Ceramic material is a particularly temperature-resistant material and so components produced from this material are resistant to high temperatures and have little deformation or even no deformation depending on temperature. Therefore, the control device, which is produced from a ceramic material, is particularly reliable in operation. Furthermore, the blocking member has low heat conduction compared to a blocking member made from a metallic material.

In a further embodiment, the closure element is designed as a two-part closure element comprising a first element part and a second element part, wherein the first element part at least partially surrounds the second element part. The advantage of the two-part closure element is to be found in the fact that both the through-flow opening in the flow-separating wall and also the through-flow opening of the bypass duct is to be opened and closed. In particular, provided that the first element part and the second element part can move independently of one another, an enlarged margin for control is created. In particular, in the case of a cylinder shut-off, one of the flows could also be closed but the bypassing of the turbine wheel could still be controlled.

In a further embodiment, the first element part comprises a first closure body part with a first shaft part, and the second element part comprises a second closure body part with a second shaft part, wherein, the second shaft part is at least partially received in a movable manner in the first shaft part. Therefore, the two-part closure element is optimized in terms of installation space. Furthermore, additional bearing and/or guidance of the second shaft part, which is mounted and/or disposed in a guided manner in the first shaft part, is omitted, which reduces costs.

In a further embodiment, in order to reduce the weight of the control device and therefore of the exhaust turbocharger as a whole, the first closure body part surrounds the second closure body part.

Further advantages, features and details of the invention will be apparent from the following description of preferred exemplified embodiments and with reference to the drawing.

The features and combinations of features mentioned earlier in the description and the features and combinations of features mentioned hereinunder in the description of the figures and/or illustrated in the figures alone can be employed not only in the combination stated in each case but also in other combinations or on their own. Like or functionally identical elements are allocated identical reference signs. For reasons of clarity it is possible for the elements not to be provided with their reference sign in all figures, but this does not mean that they are no longer allocated same.

DETAILED DESCRIPTION

Figure 1:
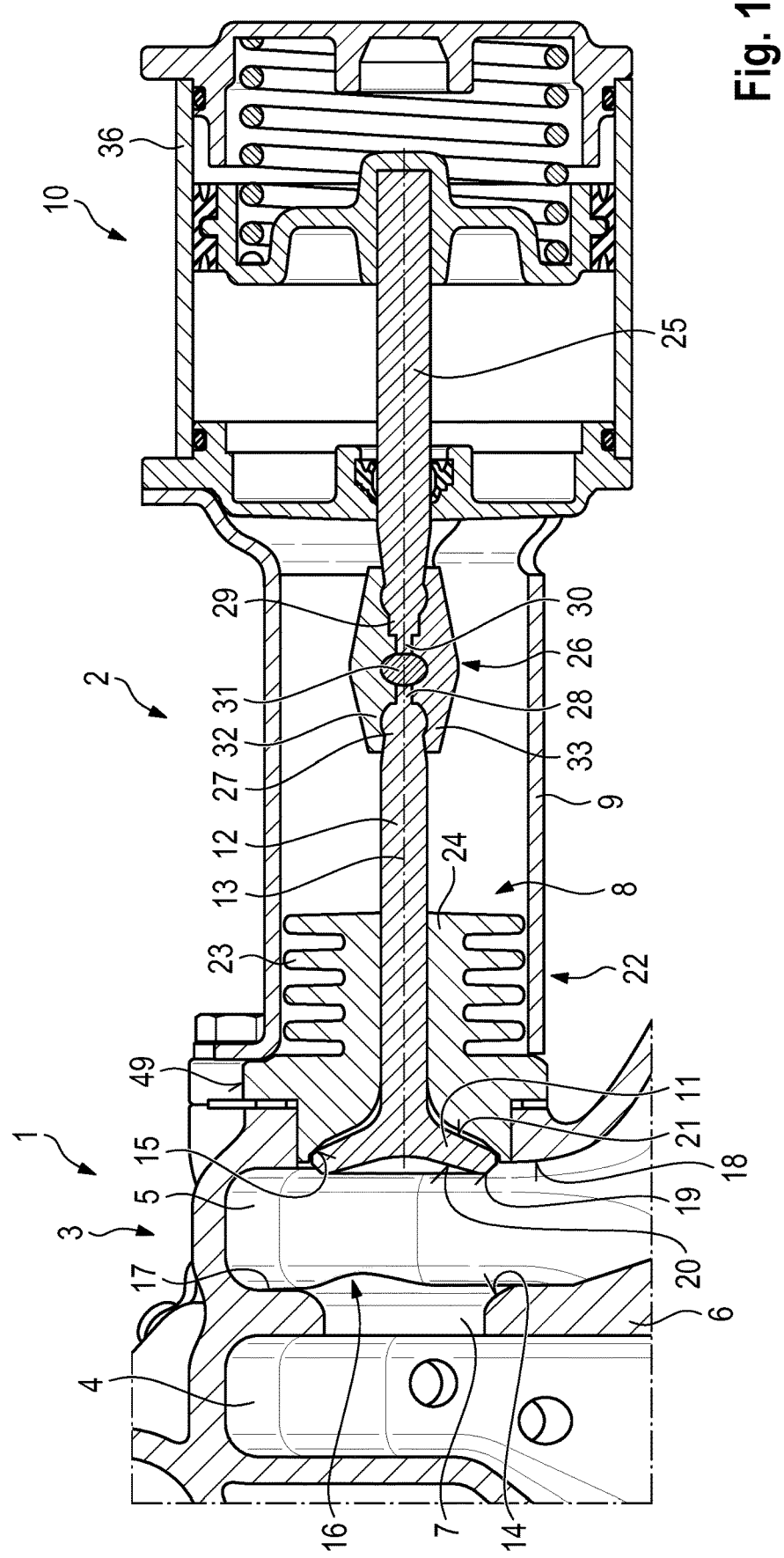
FIG. 1 shows a longitudinal cross-sectional view of an exhaust turbocharger with a control device in a first exemplified embodiment, in a first position.

An exhaust turbocharger 1 is illustrated according to FIG. 1 and comprises a control device 2. The exhaust turbocharger 1 is designed for attachment to an internal combustion engine, not illustrated in more detail, which is designed as a diesel engine or as an Otto engine. During operation, the internal combustion engine draws in combustion air via a fresh air line, not illustrated in more detail, which air, following combustion in the internal combustion engine effected with an intake of fuel, is discharged as exhaust gas via an exhaust gas tract, not illustrated in more detail.

The exhaust turbocharger 1 with its exhaust gas-conducting section 3, through which a flow can pass, is connected in a manner permitting through-flow to the exhaust gas tract and to an air-conducting section, not illustrated in more detail and through which a flow can pass, to the fresh air line. Positioned between the air-conducting section and the exhaust gas-conducting section is a bearing section, not illustrated in more detail, for rotationally receiving a rotor assembly, not illustrated in more detail, of the exhaust turbocharger.

The rotor assembly comprises a compressor wheel for taking in and compressing combustion air, a turbine wheel for expansion of exhaust gas and a shaft connecting the compressor wheel to the turbine wheel for conjoint rotation therewith. The compressor wheel is rotatably mounted in the air-conducting section, the turbine wheel is rotatably mounted in the exhaust gas-conducting section and the shaft is rotatably mounted in the bearing section.

During operation of the internal combustion engine, the turbine wheel is caused to perform a rotational movement as a result of being acted upon by the exhaust gas of the internal combustion engine, wherein, with the aid of the shaft, the compressor wheel is likewise caused to rotate and so it draws in and compresses fresh air or combustion air.

In order to improve the operating behavior of the exhaust turbocharger 1, in particular in the case of low loads and rotational speeds of the internal combustion engine, the exhaust gas-conducting section 3 is designed for dual flow and comprises a first flow 4 and a second flow 5. The first flow 4 is separated from the second flow 5 by a flow-separating wall 6, fixed to the housing, in the exhaust gas-conducting section 3. The flows 4, 5 are designed as a duct through which a flow can pass.

In a first variant, the exhaust gas-conducting section 3 additionally has a variable turbine geometry to further improve the operating behavior of the exhaust turbocharger 1.

Upstream of the turbine wheel is a through-flow opening 7 in the flow-separating wall 6, which can be opened or closed with the aid of a closure element 8 of the control device 2. Therefore, a build-up of exhaust gas upstream of the turbine wheel and/or a flow against the turbine wheel can be controlled. In other words, this means that it is possible either to control the guiding of the exhaust gas, separated into both flows, onto the turbine wheel, as corresponds to a pulse turbocharging, or to control the guiding of the exhaust gas in the form of a ram induction out of the turbine wheel, as achieved when the through-flow opening is being opened.

The control device 2 comprises, apart from the closure element 8, a housing 9 receiving the closure element 8, and an actuator 10. The closure element 8 is designed as a poppet valve, wherein a closure body 11 of the closure element 8, which is fastened to a shaft 12 of the closure element 8, is of a conical structure. The closure element 8 is mounted in the housing 9, in particular so as to be movable axially along the longitudinal axis 13 thereof. In the present exemplified embodiment, the housing 9 also serves to fasten the actuator 10. In the same way, the housing 9 could also surround the closure element 8 only partially.

FIG. 1 illustrates the control device 2 in a first position, wherein the exhaust turbocharger 1 comprises a first operating mode, a so-called blow-around mode. In the first operating mode, the turbine wheel is acted upon by exhaust gas from both flows 4, 5, wherein, upstream of the turbine wheel, a part of the exhaust gas is diverted from the first flow 4 into the second flow 5 and vice versa. In this first operating mode, a so-called ram induction is present. In other words, this means that a pressure compensation can take place via the through-flow opening 7 and a more or less equal pressure upstream of the turbine wheel arises in both flows 4, 5.

Figure 2:
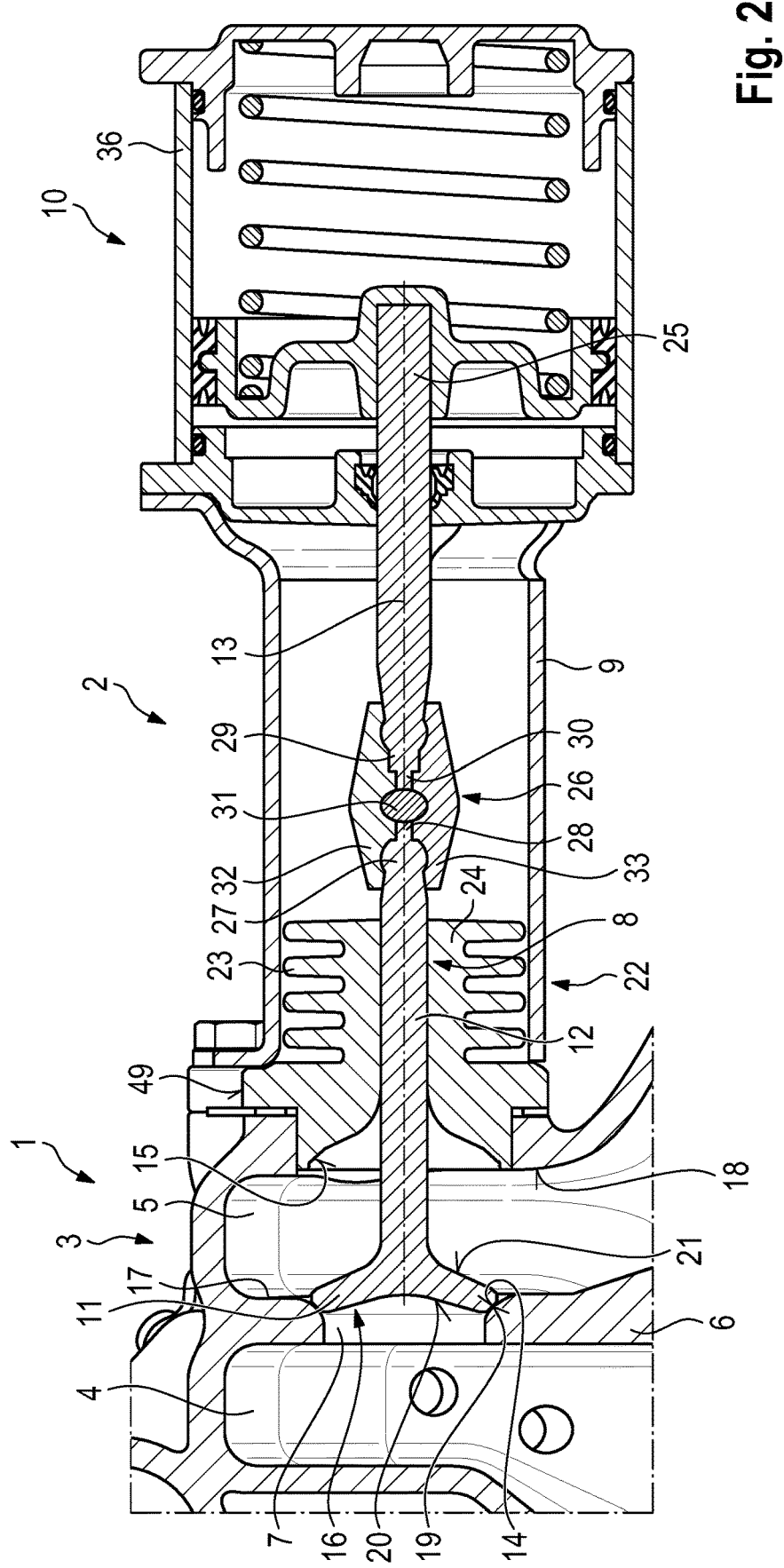
FIG. 2 shows a longitudinal cross-sectional view of the exhaust turbocharger with the control device according to FIG. 1, in a second position.

A second operating mode of the exhaust gas-conducting section 1 corresponds to a so-called pulse turbocharging, wherein the through-flow opening 7 is closed with the aid of the closure element 8. In the second operating mode, the turbine wheel is acted upon with different pressures, according to the pressure wave ends applied to the flow ends opposite the turbine wheel. In the second operating mode, the closure element 8 is disposed in a second position in the exhaust gas-conducting section 3, see FIG. 2.

In order to receive the closure element 8 in a flow-sealed matter, the exhaust gas-conducting section 3 comprises a first element seat 14 and a second element seat 15. The first element seat 14 is allocated to the through-flow opening 7 and is formed on the opening side 16 of the through-flow opening 7, which faces the actuator 10. The first element seat 14 is therefore a part of a first wall 17 defining the second flow 5. Opposite the first wall 17 is a second wall 18 which defines the second flow 5 in the radial direction. The second wall 18 corresponds to a wall close to the actuator, whereas the first wall corresponds to a wall remote from the actuator.

The housing 9 receiving the closure element 8 protrudes into the second wall 18. In other words, this means that the housing 9 is to be considered as part of the second wall 18 in order to produce an axially closed second flow 5.

The second element seat 15 is formed opposite the first element seat 14 in the housing 9. The first element seat 14, which is annular, is complementary to an annular section surface 19—which faces the first element seat 14—of a bottom surface 20—which faces the first element seat 14—of the closure body 11. In other words, this means that the first element seat 14 is designed to correspond to the section surface 19, so that, when the closure element 8 is in the second position, an overflow of exhaust gas from the first flow 4 into the second flow 5 and vice versa is prevented. The element seats 14, 15 and the section surface 19 and the top surface 21 have a conical or frustoconical contour. Therefore, in the event of contact of the element seats 14, 15 with the surfaces 19, 21 opposite them, a two-dimensional seal can be formed. In the same way, a linear seal could also be formed, provided that the element seats 14, 15 have point contact with the surfaces 19, 21 opposite them.

In an exemplified embodiment not illustrated in more detail, the second element seat 15 is formed in the wall 18 close to the actuator, wherein the housing 9 does not surround the closure body 11 at the section surface 19 thereof.

The second element seat 15 is complementary to a top side 21—facing away from the bottom side 20—of the closure body 11. Therefore, an outflow of exhaust gas from the exhaust gas-conducting section 3 is avoidable. In other words, this means that the second element seat 15 is designed to correspond to the top side 21.

The housing 9 is designed to guide the closure element 8, wherein the shaft 12 of the closure element 8 is received in an axially movable manner by a cooling element 22 in the form of a hollow cylinder 24 comprising cooling ribs 23, wherein a peripheral section 49 of the cooling element 22 functionally forms a section of the housing 9, since the shaft 12 is received in the hollow cylinder 24. In this exemplified embodiment, the second element seat 15 is formed on the cooling element 22 which is designed as a part of the housing 9, since it surrounds the closure element 8.

In order to produce a compensation for play, in particular one which is temperature-dependent and position-tolerance-dependent, the shaft 12 comprises a coupling element 26 connecting it to an actuator push rod 25. The actuator 10 is designed as a conventional spring-loaded control element. In the same way, the actuator 10 could also be designed, as illustrated in the second exemplified embodiment according to FIG. 3, as a double-acting cylinder with a force effect in both directions of the longitudinal axis 13.

The coupling element 26 is designed to receive, in a complementary manner, a spherical first end 27 of the shaft 12, facing away from the closure element 8, wherein in order to avoid excessive inclination of the shaft 12, a cylindrical shaft extension 28 is formed. A likewise spherical second end 29 of the actuator push rod is received opposite to the first end 27 in the coupling element 26, wherein a cylindrical push rod extension 30 is formed opposite to the shaft extension 28. A clamping element 31 for fixedly connecting a first coupling element part 32 and a second coupling element 33 is disposed between the two extensions 28, 30. The coupling element 26 is designed in two parts for easier reception of the two ends 27, 29.

The shaft 12 is disposed coaxially with the actuator push rod 25.

Figure 3:
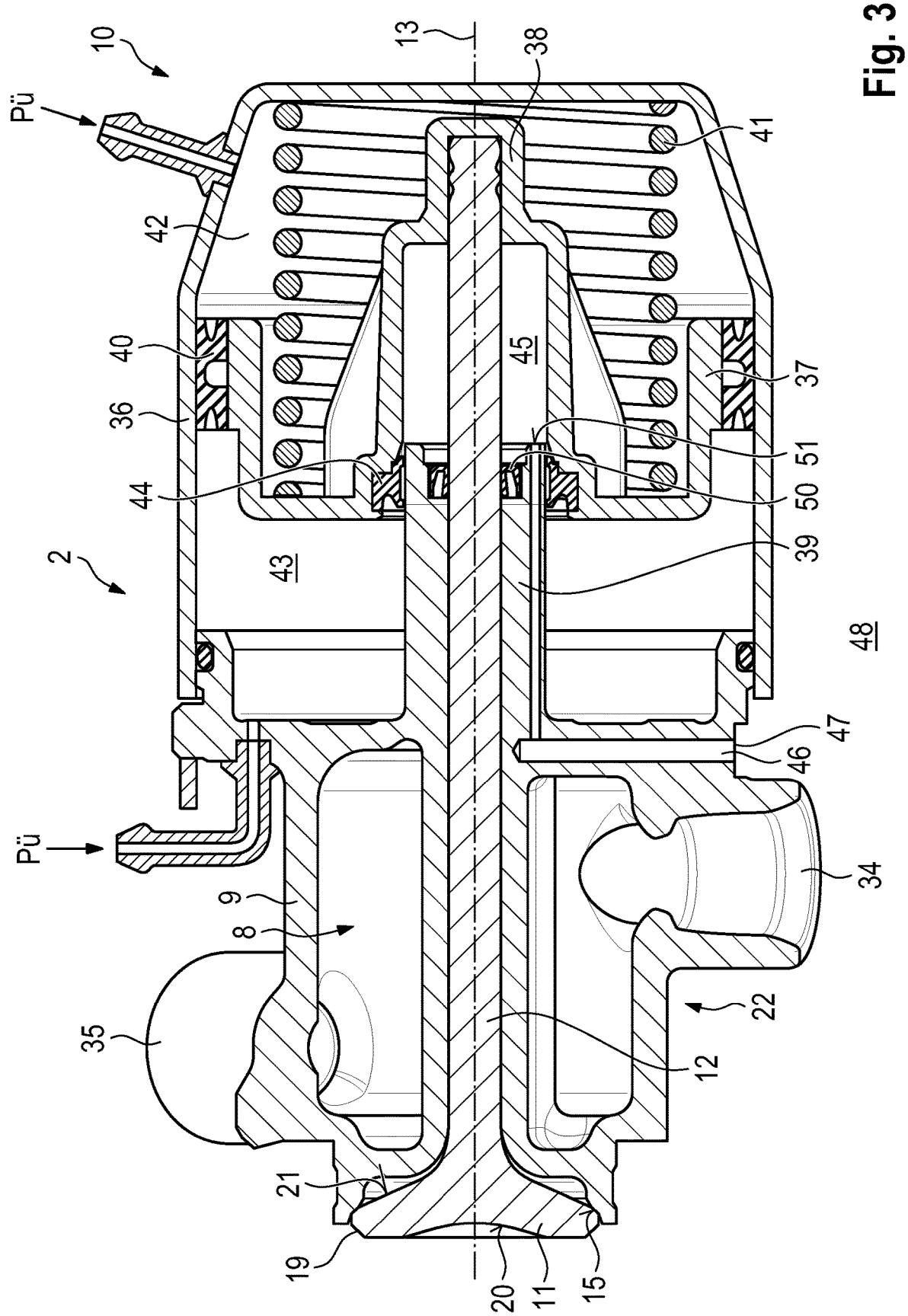
FIG. 3 shows a longitudinal cross-sectional view of the control device, in a second exemplified embodiment.

In a second exemplified embodiment, the control device 2 is constructed according to FIG. 3. The cooling element 22 is designed in the form of a cooling water jacket surrounding the shaft 12 and comprising an inlet 34 for letting cooling water in and an outlet 35 for draining the cooling water. The inlet 34 is preferably formed further from the exhaust gas-conducting section 3 than the outlet 35 so that, by reason of the exhaust gas-conducting section 3 which is hot during operation of the exhaust turbocharger 1, entry of heat into the cooling element 22 by convection is avoided.

The closure element 8 is received at its first end 27 in an actuator housing 36 of the actuator, which in this case is designed as an actuator 10 acting in a two-sided manner, on a movable actuator carriage 37 and is guided at that location. The actuator carriage 37 comprises a first sealing element 40, preferably in the form of a piston seal, for sealing an actuator chamber 42, which receives a tensioning element 41 and is acted upon by pressure, with respect to a movement chamber 43 formed between the actuator carriage 37 and the housing 9, as well as for sealing the movement chamber 43 when it is acted upon by pressure in order to produce a second position of the closure body 11 in which it is pressed against the second element seat 15. In the second position, the closure body 11 is pressed with the aid of the tensioning element 41 against the first element seat 14.

In an inexpensive manner, the shaft 12 at its first end 27 comprises a press-fit connection with a holding element 38 formed on the actuator carriage 37. In the same way, screwed connections are possible, or it is possible to use securing elements such as e.g. snap rings or securing rings or securing discs in order to connect the actuator carriage 37 to the shaft 12.

For secured guidance of the closure element 8, the housing 9 comprises a guiding element 39 which protrudes into the actuator carriage 37 and which is designed as a hollowing cylinder in this second exemplified embodiment. A second sealing element 44 for further sealing of the movement chamber 43 is formed between the actuator carriage 37 and the guiding element 39.

In order to produce a pressure compensation in a receiving chamber 45 formed between the actuator carriage 37 and the closure element 8, in particular the shaft 12, a compensation duct 46 is formed in the guiding element 39 and is connected to the environment 48 at its duct end 47 remote from the receiving chamber 45. In order to prevent any exhaust gas from being able to pass from the flows 4, 5 into the receiving chamber 45, and therefore via the compensation duct 46 into the environment 48, a third sealing element 50 is provided on a guiding element end 51 which faces the receiving chamber 45.

In a further variant, not illustrated in more detail, the closure element 8 is formed from a ceramic material. The housing 9 is preferably likewise formed from a ceramic material.

The control device 2 can fundamentally be integrated at different points. Thus, the control device 2 could likewise be formed in a manner connecting or separating two spirals of the exhaust turbocharger 1. Alternatively, upstream of the exhaust turbocharger 1, the control device 2 is designed to connect or separate exhaust gas-conducting lines of the exhaust gas track in a manner permitting through-flow.

However, as shown in the exemplified embodiments, the control device 2 is advantageously integrated into the exhaust gas-conducting section 3 so that, upstream of the turbine wheel, exhaust gas can be diverted out of the first flow 4 into the second flow 5 and vice versa or can be blown around. Positive flow effects which arise owing to the blow-around can be exploited owing to the short flow paths starting from the control device 2 to the turbine wheel.

In a further exemplified embodiment not illustrated in more detail, the control device 2 is provided for blowing off past the turbine wheel, wherein a blow-off duct is formed upstream of the turbine wheel branching off from the flows and downstream of the turbine wheel issuing into an outlet duct of the exhaust turbocharger 1. The closure element 8 serves in this case to close and open the blow-off duct.

Figure 4:
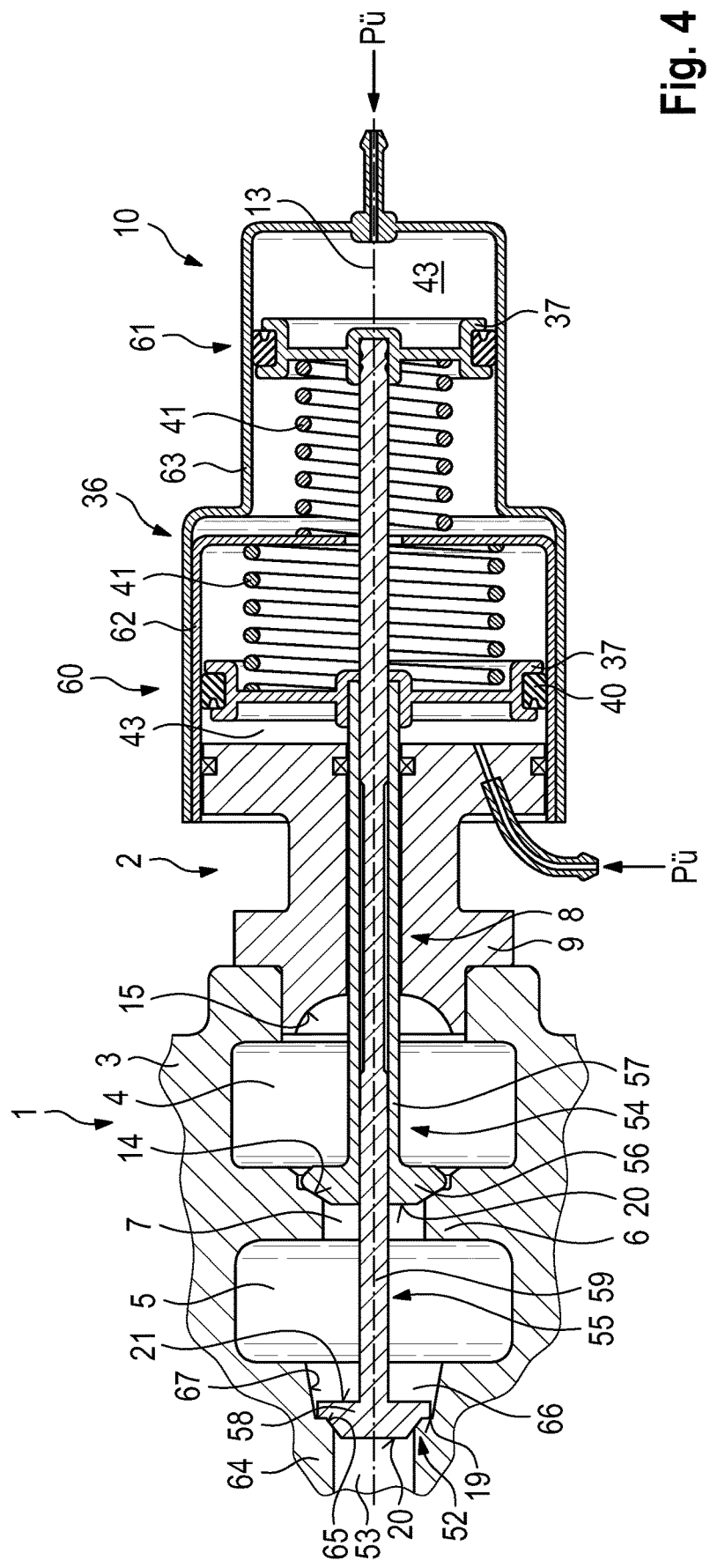
FIG. 4 shows a longitudinal cross-sectional view of the control device, in a third exemplified embodiment.

FIG. 4 illustrates the control device 2 in a third exemplified embodiment. The control device 2 is additionally designed to open and close the through-flow opening 7 in order to open and close a further through-flow opening 52. The further through-flow opening 52 is allocated to a bypass duct 53 which serves to guide exhaust gas past the turbine wheel.

The further through-flow opening 52 is to be opened and closed with the aid of the closure element 8, wherein the closure element 8 is designed as a two-part closure element and comprises a first element part 54 and a second element part 55. The first element part 54 is to be moved independently of the second element part 55 and serves to open and close the through-flow opening 7. The second element part 55, which can be moved independently of the first element part 54, is provided to open and close the further through-flow opening 52. The first element part 54 and the second element part 55 are disposed coaxially.

The first element part 54 comprises a first closure body part 56 which is fixedly connected to a first shaft part 57 of the shaft 12. The second element part 55 comprises a second closure body part 58 which is fixedly connected to a second shaft part 59 of the shaft 12. The second shaft part 59 is received in the first shaft part 57 in an axially movable manner.

The actuator 10 is also designed as a two-part actuator, comprising a first actuator section 60 and a second actuator section 61 so that the first element part 54 can be moved independently of the second element part 55.

The actuator housing 36 comprises a first housing section 62 and a second housing section 63, wherein the first housing section 62 is allocated to the first actuator section 60 and the second housing section 63 is allocated to the second actuator section 61.

The two actuator sections 60, 61 are of a functionally identical structure. They each comprise an actuator carriage 37 and a tensioning element 41 which can move the actuator carriage 37 according to the pressure present in the respective movement chamber 43. The two actuator carriages 37 are disposed so as to be able to move oppositely to one another.

The further through-flow opening 52 is formed in a further wall 64 of the exhaust gas-conducting section 3, which is formed opposite to the flow-separating wall 6 facing away from the actuator 10. The further wall 64 comprises a further element seat 65 of the exhaust gas-conducting section 3, which is at least partially complementary to an annular section surface 19 of the bottom surface 20 of the second closure body part 58.

The second closure body part 58 comprises a top surface 21 which faces away from its bottom surface 20 and is designed in a profiled manner for flow-optimized circulation. In other words, this means that in its release position of the further through-flow opening 52 it can be positioned in the second flow 5, wherein it only slightly disrupts the flow formed therein so that no breaks, or only moderate breaks, in flow occur.

A guiding chamber 66, which is formed between the second flow 5 and the further through-flow opening 52 and in which the second element part 55 is movably present, comprises an at least partially conical chamber contour 67. This serves to release different cross-sections, depending on the axial position of the closure body 58 in the guiding chamber 66, for outflow into the through-flow opening 52 and therefore to permit differentiated control, or in other words sensitive control. In addition, it serves for jamming-free movement of the second element part 55. The fluctuating exhaust gas temperatures arising in the exhaust gas-conducting section lead to changes in the geometry of the exhaust gas-conducting section and in the components received in the exhaust gas-conducting section 3 so that, in the case of cylindrical contour 67, jamming of the second closure body part 56 in the guiding chamber 66 could definitely occur.

In order to receive the second closure element part 55, the first closure element part 54 could also be designed in a shell-like manner in such a way that the second closure element part 55 is surrounded at least partially by the first closure element part 54.

The shaft 12 and the actuator push rod 25 are disposed coaxially or can be designed as one piece. The actuator 10 can be designed as a single-acting or double-acting pneumatic cylinder. An implementation as an electric or electromagnetic actuator 10 is also feasible. The necessary sealing force for pressing the closure body 11, 56, 58 onto the element seat 14, 15, 65 is applied or supported by the tensioning element 41 preferably received in the actuator 10, preferably in the form of a spiral spring. Depending on the arrangement of this tensioning element 41, it can effect or support the opening or closing of the corresponding through-flow opening 7, 52.

In the exemplified embodiments explained above, the exemplified actuator 10 functions with the aid of an overpressure pÜ. It could likewise be acted upon by a negative pressure.

The invention claimed is:

1. A control device for an exhaust gas-conducting section of an exhaust turbocharger,
    wherein the exhaust gas-conducting section (3) through which a flow can pass comprises at least one duct (4; 5; 53) through which a flow can pass and which comprises a through-flow opening (7; 52) which, with the aid of a closure element (8) of the control device (2), can be fully or at least partially blocked or released, and
    wherein the control device (2) comprises an actuator (10) for moving the closure element (8), and
    wherein the closure element (8) is designed as a poppet valve,
    wherein the closure element (8) can be moved at least into a first position in order to release the through-flow opening (7; 52) and into a second position in order to block the through-flow opening (7; 52), and
    wherein the closure element (8) can be disposed at least in one of the positions in a wall of the exhaust gas-conducting section (3), and
    wherein the closure element (8) comprises a closure body (11) closing or releasing the through-flow opening (7; 52), which closure body comprises an annular section surface (19) on its bottom surface (20) which faces the through-flow opening (7; 52), which section surface is designed to correspond to an element seat (14; 15; 65) formed in the wall, and
    wherein the closure element has a top surface (21) which faces away from the bottom surface (20) and is designed in a profiled manner in order to produce the top surface (21) at least partially corresponding to another element seat (15; 14) and to achieve flow-optimized circulation, wherein the element seats (14,15) and the section surface (19) as well as the top surface (21) comprise a conical or frustoconical contour, and wherein in order to cool the closure element (8) a cooling element (22) is formed at least partially surrounding the closure element (8).

2. The control device as claimed in claim 1, wherein the exhaust gas-conducting section (3) through which a flow can pass comprises the duct (4; 5) in form of a first flow (4) through which a flow can pass and/or a second flow (5) through which a flow can pass, which, with the aid of a flow-separating wall (6), can have fluid flowing through them separately from each other, and wherein the closure element (8) can fully or at least partially block or release the through-flow opening (7) formed in the flow-separating wall (6), and wherein the closure element (8) can be disposed in its first position for release of the through-flow opening (7) in the wall (18) formed opposite to the flow-separating wall (6), and can be disposed in a second position for blocking the through-flow opening in the flow-separating wall (6).

3. The control device as claimed in claim 1, wherein a shaft (12) of the closure element (8) can be cooled.

4. The control device as claimed in claim 3, wherein the cooling element (22) surrounds the shaft (12).

5. The control device as claimed in claim 1, wherein the cooling element (22) is designed as cooling ribs (23) or as a water jacket.

6. The control device as claimed in claim 1, wherein a coupling element (26) is provided for connecting the closure element (8) to an actuator push rod (25) of the actuator (10).

7. The control device as claimed in claim 1, wherein the actuator (10) is designed to initiate movement of the closure element (8) coaxially to a longitudinal axis (13) thereof.

8. The control device as claimed in claim 1, wherein the through-flow opening (7) is closed with the aid of a spring force acting on the closure element (8).

9. The control device as claimed in claim 8, wherein the spring force can be formed with the aid of a tensioning element (41) received in the actuator (10).

10. The control device as claimed in claim 1, wherein, in order to guide the closure element (8), a housing (9) comprises a holding element (38) protruding into an actuator housing (36).

11. The control device as claimed in claim 10, wherein the holding element (38) comprises a compensation duct (46).

* * * * *